United States Patent

Trombella

[11] Patent Number: 5,191,800
[45] Date of Patent: Mar. 9, 1993

[54] ANEMOMETER

[75] Inventor: Remo Trombella, Pontremoli, Italy

[73] Assignee: Sitep S.p.A., Italy

[21] Appl. No.: 647,139

[22] Filed: Jan. 29, 1991

[30] Foreign Application Priority Data

Jan. 31, 1990 [IT] Italy ................. 12414 A/90

[51] Int. Cl.$^5$ ............................................. G01F 1/28
[52] U.S. Cl. ............................ 73/861.74; 73/170.02
[58] Field of Search ............... 73/189, 861.73, 861.74, 73/861.75, 861.71

[56] References Cited

U.S. PATENT DOCUMENTS 4,631,959 12/1986 Motycka ................. 73/861.71 X
4,788,869 12/1988 Li ............................ 73/861.74 X

FOREIGN PATENT DOCUMENTS 533870 10/1976 U.S.S.R. ...................... 73/861.75

Primary Examiner—Herbert Goldstein
Attorney, Agent, or Firm—Larson and Taylor

[57] ABSTRACT

An anemometer, in which a preferably cylindrical flow-capturing surface (1) is fastened to the control lever (10) of an electrical transducer (2) which is fixed to the top of a support (16) mounted in a box (15). The flow-capturing surface (1) is fastened to a cylindrical hollow body (18) arranged in an annular chamber (19) which surrounds the electrical transducer (2) and the support (16) thereof. The upper part of the cylindrical body (18) is passed through an opening (315) formed in the upper wall (115) of the box and sealingly closed by a resilient annular collar (14) fixed to the cylindrical hollow body (18) and to the upper wall (115) of the box (15). The flow-capturing surface (1) is protected by a covering disc (23) fastened to the upper wall (115) of the box (15) by spaced thin rods (24).

17 Claims, 2 Drawing Sheets

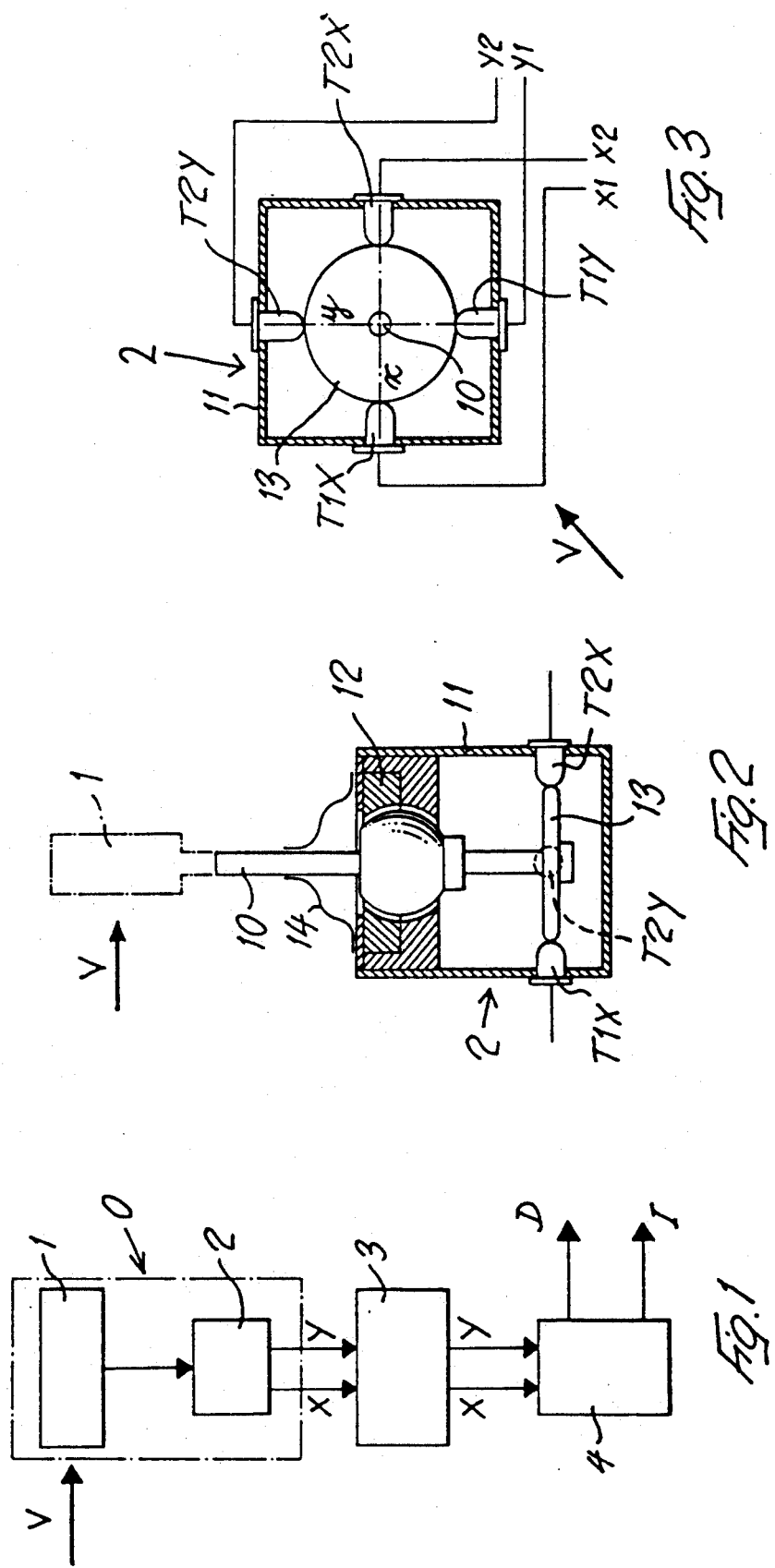

ANEMOMETER

SUMMARY OF THE INVENTION

The invention relates to an anemometer comprising: a box with a bottom part, side walls, an upper wall and various chambers therein; a flow-capturing surface which is responsive to the pressure force as exerted by an air flow, and is mounted on the top of the box externally thereto, so as to be yieldable in all directions; an electrical transducer fixed inside the box and comprising a control lever which is operatively connected to the flow-capturing surface so as to have the pressure force as exerted by the air flow on the flow-capturing surface converted into electrical signals corresponding to the direction and to the extent of said force.

The invention aims to provide an anemometer of the above-disclosed type, in which notwithstanding that the flow-capturing surface is yieldably mounted in all directions, a balancing and stabilization of the said flow-capturing surface and a perfect seal of the anemometer box, as well as a full protection of the electrical transducer and the parts being associated therewith, are ensured with not much expensive means of a simple construction.

The invention solves this problem with the provision of an anemometer of the above-disclosed type, characterized by the combination of the following features:

the flow-capturing surface is carried by the control lever of the electrical transducer and is fixed to a cylindrical hollow body arranged in an annular chamber which surrounds the electrical transducer and is of such a size as to permit the cylindrical body to oscillate in all directions transversely to its axis, the cylindrical body has its upper part passed through an opening which is formed in the upper wall of the box and is closed by a bellows-like annular collar made of resilient material, and sealingly fastened by its inner circumference to the cylindrical body and by its outer circumference to the upper wall of the box, the electrical transducer is fixed to the top of a support, which is fastened to the bottom part of the box and extends into the interior of the cylindrical body through the open bottom end thereof.

In a preferred embodiment of the invention, the transducer-carrying support consists of a cylindrical hollow member and the amplifier of the signals from the transducer is accommodated under the transducer into the said cylindrical hollow member.

The flow-capturing surface may have any shape depending upon the type of measurement, particularly upon the desired measurement accuracy. In a preferred embodiment of the invention, the flow-capturing surface has a rotational symmetry and is mounted co-axially on the control lever of the electrical transducer, this control lever being yieldably mounted in all directions by means of a spherical bearing provided at an intermediate region of the control lever, one end of the latter carrying the flow-capturing surface, while the other end thereof has affixed thereto—perpendicularly to the control lever—an actuating member of the electrical transducer.

The electrical transducer can be any transducer type which generates electrical signals corresponding to the direction and the intensity of the pressure force as exerted by an air flow on the flow-capturing surface. Preferably, potentiometric transducers (of the joystick type), transformer transducers, piezoelectric semiconductor transducers, or the like, may be used.

The main advantages as afforded by the anemometer according to the invention, reside in the feature that the cylindrical body which is integral with the flow-capturing surface, and is movable therewith, however inside the closed hollow space in the anemometer box, and the resilient collar connecting the said cylindrical body to the upper wall of the anemometer box, will ensure such a balancing and stabilization of the said flow-capturing surface that the anemometer is rendered insensitive to the conditions of movement of its support, and that the highest precision in measurements is guaranteed, even when the anemometer is mounted in a watercraft. At the same time, the electrical transducer and all the parts which are associated therewith, are located inside the anemometer box in a sealed condition therein, so that the same are shielded from atmospheric agents, which also contributes to guarantee the highest possible precision in measurements.

BRIEF DESCRIPTION OF THE DRAWINGS

The particular features of the invention and the advantages arising therefrom will appear more in detail from the description of some preferred embodiments, shown by way of non-limiting examples in the accompanying drawings, wherein:

FIG. 1 is a block diagram of an anemometer according to the invention;

FIGS. 2 and 3 show a sectional view on a plane being transverse to and a plane being parallel to the direction of the air flow, respectively, of an exemplary embodiment of the anemometer according to FIG. 1;

DESCRIPTION OF THE PREFERRED EMBODIMENTS

Figure 4:
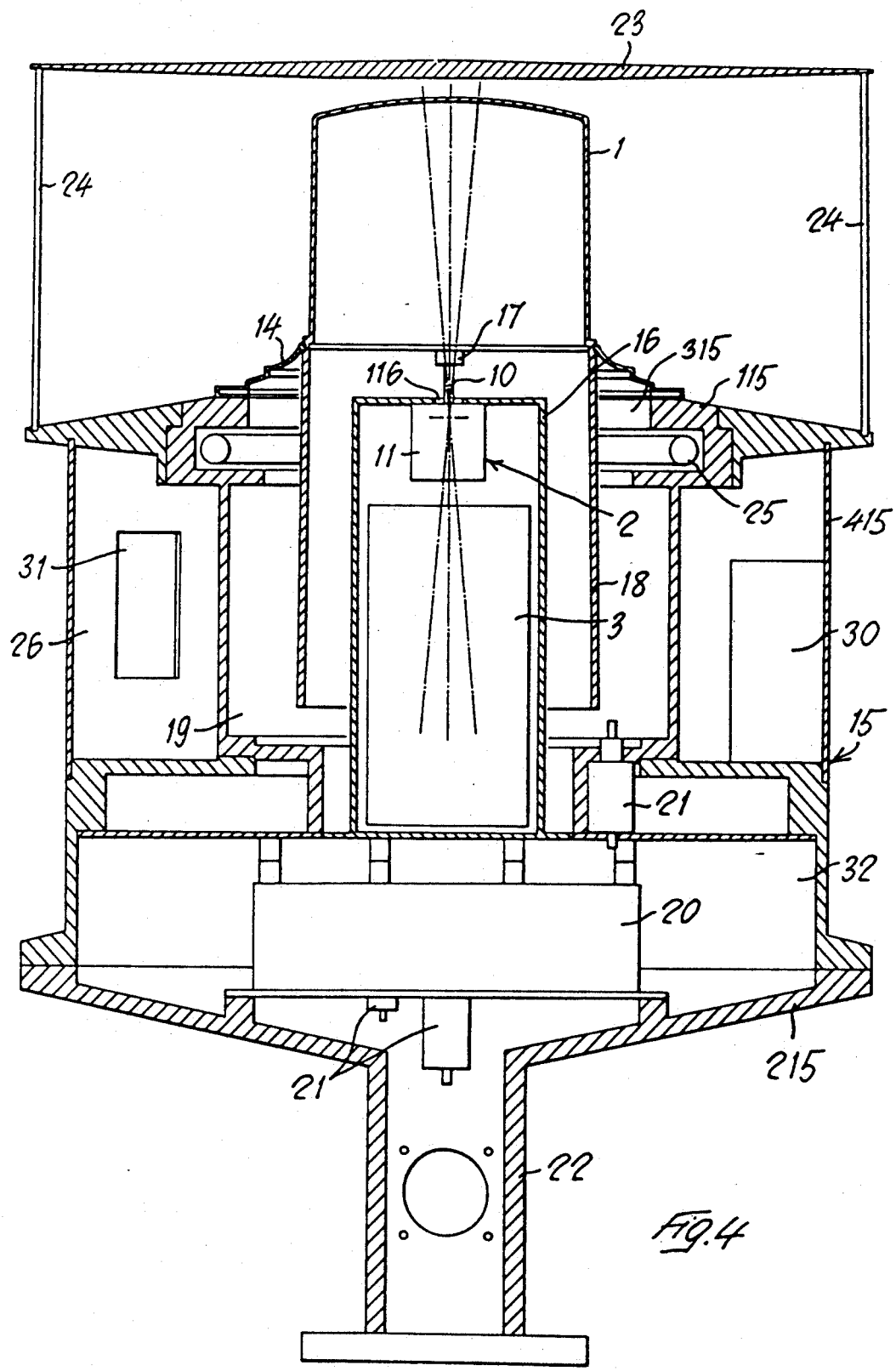
FIG. 4 is an axial sectional view of an anemometer according to the invention.

With reference to FIG. 1, reference V denotes a vector oriented in the direction of an air flow and the module (length) of which indicates the intensity of the air flow. In order to detect the direction and intensity of the air flow V, one single sensing member is provided, constituted by a flow-capturing surface 1 which controls an electrical transducer 2. The air flow applies a force on the flow-capturing surface 1, and the said force is converted into electrical signals by being transferred to the electrical transducer 2 which is operatively connected to the flow-capturing surface 1. The force being exerted on the flow-capturing surface 1 in vectorial form will be resolved in the transducer 2 into two values corresponding to the projections of said force vector onto the axes of a system of coordinates. Therefore, the transducer 2 emits two electrical signals X, Y corresponding to the components of the force vector in the direction of each of the two axes of the system of coordinates, and proportional to the intensity of the force in the direction of the associated axis. Thereafter, the signals X and Y are amplified and cleared of any possible disturbance signals in an amplifier 3, and finally they are processed, preferably, through a suitable electronic computer 4 where the direction D and the intensity I of the fluid flow will be found out. These values may be displayed in any manner, for example, by suitable visualizing means, such as angle and speed indicators, printed graphs, video images, or the like. Preferably, the electrical signals X, Y generated by the transducer 2 are of the analog type, and they are converted into digital type signals in said processor 4 or upstream thereof. As the system of coordinates, the use is preferred of a Cartesian system, the axes of which are oriented perpendicularly to each other. However, in particular cases, reference may be made to other types of systems of coordinates.

The flow-capturing surfaces 1 of the sensing means may be of any type. More particularly, when the determination is desired of the intensity of a unidirectional air flow or in only one of the directional components of said flow, the flow-capturing surface 1 may be constituted by a planar surface. When the direction and intensity of an air flow having any orientation is to be determined, the flow-capturing surface 1 may advantageously have a rotationally symmetrical configuration.

FIGS. 2 and 3 diagrammatically show an exemplary embodiment of an anemometer for measuring the intensity and the direction of an air flow according to the invention.

The anemometer shown in the FIGS. 2 and 3 comprises a control lever 10 which is so mounted as to be yieldable in all directions transversely to its longitudinal extent in a box 11 by means of a spherical bearing 12. Secured to the free end of the control lever 10 outside of the box 11 is the flow-capturing surface 1, which is shown by dot-and-dash lines to mean generally any shape. The choice of the shape of the flow-capturing surface 1 changes depending upon the measurement conditions. The opposite end portion of the control lever 10 extends beyond the spherical bearing 12 and is provided at the end thereof with a pressure disc 13 which is disposed perpendicularly to the control lever 10. The pressure disc 13 bears against two pairs of electrical transducers T1X, T2X and T1Y, T2Y. The electrical transducers T1X, T2X and T1Y, T2Y of each pair are arranged diametrically opposite to each other and the pairs of transducers are co-planar to each other and to the pressure disc 13. The axes wherealong the pairs of transducers T1X, T2X and T1Y, T2Y are aligned, are perpendicular to each other, whereby said transducers are arranged crosswise. The individual pairs of electrical transducers T1X, T2X and T1Y, T2Y define, therefore, a system of Cartesian axes in a plane which is trasverse to the extent of the control lever 10, while the control lever 10 is yieldable as for its inclination thanks to the spherical support 12. The interior of the box 11 is substantially sealed to the exterior by means of a bellows-like collar 14 adhering to the control lever 10 and the upper side of the box 11.

As a result of the foregoing features, and in accordance with the conditions shown in FIGS. 2 and 3, the force applied by an air flow V to the flow-capturing surface 1 causes an inclination of the control lever 10 in the direction of the air flow and of an angular amplitude corresponding to the intensity of the flow. By being inclined, the control lever 10 pushes the pressure disc 13 against the diametrically opposite electrical transducers T1X, T1Y, which generate an electrical signal X1, Y1, respectively, which is proportional to the pressure or compressive force exerted by the control lever 10 against the electrical transducers T1X, T1Y. As described above, the values of the intensity and direction of the air flow V may be obtained from said electrical signals after they have been amplified and with the aid of a suitable electronic processor 4.

In order to obtain an improved quality of signals proportional to the force exerted by the air flow V against the flow-capturing surface 1, or to eliminate possible systematic conversion or calibration errors, when the control lever 10 is perfectly perpendicular to the plane containing the electrical transducers T1X, T2X and T1Y, T2Y—which is the rest condition of the anemometer—the pressure disc 13 presses against all electrical transducers T1X, T2X and T1Y, T2Y by the same measure, preferably the measure of 50% of the maximum pressure which may be exerted on them, whereby—when the control lever has reached a position of maximum pressure against one of the transducers T1X, T1Y of each pair—the pressure being exerted against the associated electrical transducer T2X, T2Y is either zero or a minimum value. Thus, the electrical signal corresponding to the magnitude of a component of the force vector along either one of the axes x, y of the system of coordinates is determined by comparing the signals which are obtained by the two associated transducers T1X,T2X; T1Y,T2Y.

As electrical transducers T, different types of elements generating an electrical signal proportional to a pressure or other stressing force may be used, such as, for example, transducers of the potentiometric type, transformer type, piezoelectric semiconductor type, pneumatic type, or the like.

The shape and size of the flow-capturing surface 1 may be of any type depending on the desired sensitivity and the type of measurement. The illustrated exemplary embodiment relates to an anemometer for measuring the intensity of the direction of an air flow parallelly to the plane containing the transducers, i.e. transversely to the flow-capturing surface 1, and with any direction. In this instance, the flow-capturing surface 1 has a rotationally symmetrical construction with respect to the axis of the control lever 10, i.e. an axis perpendicular to the plane containing the transducers T1X,T2X,T1Y,T2Y and transverse to the direction of the air flow V, more particularly a cylindrical configuration. The diameter, obviously, is variable and may be even equal to or smaller than that of the control lever 10.

Said anemometer, however, may also be used for measuring the intensity of the air flow V with reference either to only one of the directional components or to only one direction, by either replacing the responsive flow-capturing surface, e.g. by a flattened plate, or providing a preferential path for the air flow in a given direction, e.g. by arranging the anemometer in a duct oriented in said direction. In this instance, only two electrical transducers need to be provided, for example T1X,T2Y.

A particular embodiment of the anemometer according to the invention is shown in FIG. 4 and comprises a substantially cylindrical box indicated generally at 15 which is closed at its top and bottom and is formed interiorly with a plurality of housing chambers to be described with more details hereinafter.

The transducer 2 is secured to the underside of the top wall of a central cylindrical hollow support 16 co-axially to the box 15, while the control lever 10 protrudes upwardly out of the support 16 through a hole 116. As a flow-capturing surface 1, a cylindrical surface co-axial with the control lever 10 is fixed, e.g. screwed, to the free end of the control lever 10. The cylindrical flow-capturing surface 1 is closed at its top and bottom and extends substantially out of the upper wall 115 of the box 15 through an opening 315. Arranged centrally of the bottom of the cylindrical flow-capturing surface 1 is a junction seat 17 co-axial therewith, wherein the end of the control lever 10 is engaged. The cylindrical flow-capturing surface 1 is fastened to a cylindrical hollow body 18 which extends downwardly into the interior of the box 15, i.e. into an annular chamber 19 which surrounds the central support 16. The inside and outside diameters of the annular chamber 19 and the diameter of the cylindrical body 18 are of such an extent as to permit unhindered oscillations in any direction, transversely to its axis, of the cylindrical flow-capturing surface 1, as shown by the dot-and-dash axes in FIG. 4. The opening 315 for allowing the cylindrical body 18 to pass through the upper wall 115 of the anemometer box 15 is sealed from the outside by a resilient bellows-like annular collar 14 which is sealingly fastened by its inner circumference to the cylindrical body 18 and by its outer circumference to the upper wall 115 of the box 15.

Below the electrical transducer 2, in the central hollow support 16 an amplifier 3 is provided for the electrical signals generated by the transducer 2, while in an additional chamber 32 in the area of the bottom part 215 of the box 15, the feed circuit 20 is arranged. The electrical connections between the individual chambers are made by suitable through-connectors, shown diagrammatically at 21, while the inlet for the electrical cables into the anemometer box 15 is made possible by a tubular extension 22 of the bottom part 215 of the box 15, which constitutes at the same time a stem for securing the anemometer.

Arranged above the cylindrical flow-capturing surface 1 is a covering disc 23 which is disposed parallel to the upper wall 115 of the box 15. The upper wall 115 of the box 15 and the covering disc 23 therefore constitute a wind-conveying channel which is open over 360°, permitting an improved exploitation thereof for the purpose of measuring its direction and intensity. The disc 23 may be supported in a suitable manner to avoid any turbulence that may affect both the direction and the intensity of the wind. More particularly, the covering disc 23 may be fixed to the upper wall 115 of the box 15 by means of spaced thin rods 24 or by means of a cylindrical wall having thereon a plurality of uniformly-distributed longitudinal slits for the wind flo therethrough.

According to a further improvement of the invention, in the area directly under the annular collar 14 there is an annular chamber containing electrical heating means 25 to maintain the collar 14 at a constant temperature, thus avoiding that in case of very low temperatures the loss of resiliency of the collar 14 may cause an alteration of the measurements. Moreover, as apparent from FIG. 4, the box 15 may be formed with an additional annular peripheral chamber 26 provided with slots 31 communicating with the exterior, and wherein a complete barometric station 30 may be accommodated.

Besides ensuring a considerable measurement accuracy, the anemometer for measuring the direction and intensity of an air flow according to the present invention, is of an extremely simple construction and requires only a minimum maintenance. The sensing member, which is yieldable only under the action of the air flow being exerted thereon, does not constitute a structural moving member because, depending on the type of the transducers being used, the oscillations of the flow-capturing surface are of comparatively small amplitude, and it ensures a great operating reliability and a minimum sensitivity to the dynamic stresses of the support of the device. More particularly, the anemometer according to the invention can span over a considerable measurement range, while using always the same sensing member which is not responsive to the rolling or pitching movements of a vessel in which it is mounted. The absence of moving parts permits a reduction of the costs connected to the operations of maintenance thereof. The anemometer for directly converting the force and direction of the air fluid (wind) into electrical signals permit a rapid and reliable conversion thereof into the desired measurement values with the aid of computers.

I claim:

1. An anemometer, comprising:
   a) a box with a bottom part, side walls, an upper wall and chambers therein,
   b) a flow-capturing surface which is responsive to a pressure force as exerted by an air flow and is mounted on the top of the box externally thereto, so as to be yieldable in all directions,
   c) an electrical transducer fixed inside the box and comprising a control lever which is operatively connected to the flow-capturing surface so that the pressure force, as exerted by the air flow on the flow-capturing surface, is converted into electrical signals corresponding to the direction and to the extent of said force,
   d) the flow-capturing surface being carried by the control lever of the electrical transducer and being fixed to a cylindrical hollow body arranged in an annular chamber which surrounds the electrical transducer and is of such a size as to permit the cylindrical body to oscillate in all directions transversely to its axis,
   e) the cylindrical body having an upper part extending through an opening which is formed in the upper wall of the box and is closed by a annular collar made of resilient material, said annular collar having an inner circumference and an outer circumference and being sealingly fastened by at said inner circumference to the cylindrical body and at said outer circumference to the upper wall of the box,
   f) said cylindrical body having an open bottom end and the electrical transducer being fixed to the top of a support which is fastened to the bottom part of the box and extends into the interior of the cylindrical body through the open bottom end thereof.

2. An anemometer according to claim 1, wherein the support to which the electrical transducer is fixed comprises a cylindrical hollow member and an amplifier for amplifying the signals from the transducer is accommodated under the transducer in the said cylindrical hollow member.

3. An anemometer according to claim 1, wherein the flow-capturing surface is interposed between the upper wall of the box and a covering disc which is attached to the box so that air-flow passages are provided around the flow-capturing surface.

4. An anemometer according to claim 3, wherein the covering disc is carried by the box by means of spaced thin rods.

5. An anemometer according to claim 3, wherein the covering disc is carried by the box by means of a cylindrical wall provided with slits for the throughflow of air.

6. An anemometer according to claim 1, further comprising electrical heating means provided in an annular chamber of the box under said collar.

7. An anemometer according to claim 1, further comprising a feeding circuit accommodated in a chamber in the bottom part of the box.

8. An anemometer according to claim 1, further comprising barometric means accommodated in a peripheral annular chamber of the box, said peripheral chamber being provided with slots communicating with the exterior.

9. An anemometer according to claim 1, wherein the flow-capturing surface has a rotational symmetry, the control lever of the electrical transducer being yieldably mounted in all directions of the air flow by means of a spherical bearing provided at an intermediate region of the control lever, one end of the control lever carrying the flow-capturing surface, while the other end thereof has affixed thereto an actuating member of the electrical transducer, said actuating member extending perpendicularly to said control lever.

10. An anemometer according to claim 9, wherein the electrical transducer comprises at least four individual electrical transducer elements arranged altogether perpendicularly to the control lever and disposed in a crosswise arrangement so that pairs of opposite electrical transducer elements are in alignment and define one axis of a system of coordinates for the resolution of the vector of the pressure force exerted on the flow-capturing surface, said pairs generating, when stressed, a signal corresponding to the value of the associated resolution coordinate of the vector of said force.

11. An anemometer according to claim 10 wherein the actuating member for the individual electrical transducer elements comprises a pressure disc which is arranged substantially co-planar with the plane containing the electrical transducer elements and adhering thereagainst.

12. An anemometer according to claim 11, wherein, in a condition of the control lever in which the control lever is being perpendicular to the plane containing the electrical transducer elements and which is the rest condition of the electrical transducer, the pressure disc bears against all electrical transducer elements with the same amount of force so that when the control lever reaches a position of maximum stress against one of the transducer elements of each pair, the stress exerted against the associated electrical transducer element of that pair is a minimum value, said anemometer further comprising a means for determining the electrical signal which corresponds to the magnitude of a component of the force vector along one of the axes of the system of coordinates, by comparing the pairs of signals obtained from the two associated transducer elements.

13. An anemometer according to claim 10, wherein the electrical transducer elements comprise potentiometric transducers.

14. An anemometer according to claim 1, wherein the electrical transducer comprises a joystick device, and on the free end of the joystick is fixed the flow-capturing surface.

15. An anemometer according to claim 1 wherein said annular collar comprises a bellows member.

16. An anemometer according to claim 10 wherein said electrical transducer elements comprise transformer transducers.

17. An anemometer according to claim 10 wherein said electrical transducer elements comprise piezoelectric semiconductor transducers.

* * * * *